(12) United States Patent
Kishimoto et al.

(10) Patent No.: US 7,877,520 B2
(45) Date of Patent: *Jan. 25, 2011

(54) STORAGE DEVICE AND METHOD OF SETTING CONFIGURATION INFORMATION OF SAME

(75) Inventors: Toshimichi Kishimoto, Hadano (JP); Yoshinori Igarashi, Odawara (JP); Shuichi Yagi, Matsuda (JP)

(73) Assignee: Hitachi, Ltd., Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 12/479,952

(22) Filed: Jun. 8, 2009

(65) Prior Publication Data

US 2009/0248905 A1    Oct. 1, 2009

Related U.S. Application Data

(63) Continuation of application No. 11/583,271, filed on Oct. 18, 2006, now Pat. No. 7,562,160, which is a continuation of application No. 10/635,739, filed on Aug. 5, 2003, now Pat. No. 7,136,939.

(30) Foreign Application Priority Data

Oct. 18, 2002   (JP)   ............................. 2002-303718

(51) Int. Cl.
*G06F 3/00*     (2006.01)
*G06F 15/177*   (2006.01)
*G06F 11/30*    (2006.01)
*G06F 12/14*    (2006.01)

(52) U.S. Cl. ........................... 710/8; 709/220; 709/221; 709/222; 713/191

(58) Field of Classification Search ..................... 710/8; 709/220–222; 713/191
See application file for complete search history.

(56) References Cited

U.S. PATENT DOCUMENTS

| | | | |
|---|---|---|---|
| 4,807,186 | A | 2/1989 | Ohnishi et al. |
| 5,940,509 | A | 8/1999 | Jovanovich et al. |
| 6,009,466 | A | 12/1999 | Axberg et al. |
| 6,334,075 | B1 | 12/2001 | Mase et al. |
| 6,343,324 | B1 | 1/2002 | Hubis et al. |
| 6,691,918 | B1 | 2/2004 | Yoda et al. |
| 6,910,093 | B2 | 6/2005 | Porterfield |
| 7,093,038 | B2 | 8/2006 | Ghosh et al. |

(Continued)

FOREIGN PATENT DOCUMENTS

EP    1085406 A2    3/2001

(Continued)

*Primary Examiner*—Alford W Kindred
*Assistant Examiner*—Farley J Abad
(74) *Attorney, Agent, or Firm*—Townsend and Townsend and Crew LLP

(57) ABSTRACT

Configuration information settings for a storage device are made highly reliable and facilitated. The storage device includes a service processor for setting storage device configuration information, and a terminal device connected to the service processor via a private line to send a command group, received from an operator and related to the storage device configuration information, to the service processor. The service processor also includes a device for determining approval or denial of execution of the command group prior to execution of the command group received from the terminal device.

9 Claims, 6 Drawing Sheets

U.S. PATENT DOCUMENTS

| | | |
|---|---|---|
| 2001/0018760 A1 | 8/2001 | Matsumoto |
| 2001/0027521 A1 | 10/2001 | Cromer et al. |
| 2001/0037460 A1 | 11/2001 | Porcari |
| 2002/0007365 A1 | 1/2002 | Aoyama et al. |
| 2002/0080417 A1 | 6/2002 | Quine |
| 2002/0113796 A1 | 8/2002 | Oshiyama et al. |
| 2002/0114453 A1 | 8/2002 | Bartholet et al. |
| 2002/0159304 A1 | 10/2002 | Morita et al. |
| 2003/0018889 A1 | 1/2003 | Burnett et al. |
| 2003/0023665 A1 | 1/2003 | Matsunami et al. |
| 2003/0051016 A1 | 3/2003 | Miyoshi et al. |
| 2003/0061331 A1 | 3/2003 | Nakamura et al. |
| 2003/0065902 A1 | 4/2003 | Shiga et al. |
| 2003/0097311 A1 | 5/2003 | Shinohara et al. |
| 2003/0115461 A1 | 6/2003 | O'Neil |
| 2003/0135439 A1 | 7/2003 | Yagishita |
| 2003/0167375 A1 | 9/2003 | Morishita et al. |
| 2003/0212768 A1 | 11/2003 | Sullivan |
| 2003/0220991 A1 | 11/2003 | Soejima et al. |
| 2003/0221087 A1 | 11/2003 | Nagasaka |
| 2003/0233355 A1 | 12/2003 | Maeda |
| 2004/0044830 A1 | 3/2004 | Gibble et al. |
| 2004/0064550 A1 | 4/2004 | Sakata et al. |
| 2004/0143733 A1 | 7/2004 | Ophir et al. |
| 2004/0250072 A1 | 12/2004 | Ylonen |
| 2005/0198039 A1 | 9/2005 | Hindawi et al. |

FOREIGN PATENT DOCUMENTS

| | | |
|---|---|---|
| EP | 1221651 A2 | 7/2002 |
| JP | 05-128032 | 5/1993 |
| JP | 06-175827 | 6/1994 |
| JP | 07-210475 A | 8/1995 |
| JP | 11-161604 A | 6/1999 |
| JP | 2000-181687 A | 6/2000 |
| JP | 2000-305773 A | 11/2000 |
| JP | 2001-147899 A | 5/2001 |
| JP | 2002-157211 A | 5/2002 |
| JP | 2002-199026 A | 7/2002 |
| JP | 2003-051837 A | 2/2003 |
| JP | 2003-101614 A | 4/2003 |

300 — SET OPERATION WITH GUI

301 — CHECK CONSISTENCY OF DATA AND CREATE SCRIPT SHEET

CREATE DIGEST FILE OF SCRIPT SHEET

401 — CONVERT DATABASE DESCRIBING STRUCTURAL INFORMATION INTO SCRIPT SHEET

402 — CHECK CONSISTENCY OF DATA AND CREATE SCRIPT SHEET

403 — CREATE DIGEST FILE OF SCRIPT SHEET

STORAGE DEVICE AND METHOD OF SETTING CONFIGURATION INFORMATION OF SAME

CROSS-REFERENCE TO RELATED APPLICATION(S)

This application is a continuation of U.S. patent application Ser. No. 11/583,271, filed on Oct. 18, 2006, which in turn is a continuation application of U.S. patent application Ser. No. 10/635,739, filed on Aug. 5, 2003, and issued as U.S. Pat. No. 7,136,939, on Nov. 14, 2006, which in turn claims the right of priority based on Japanese Patent Application No. 2002-303718, filed on Oct. 18, 2002, the entire disclosures of all of which are incorporated herein by reference.

BACKGROUND OF THE INVENTION

1. Field of the Invention

The present invention relates to a method of setting the configuration information of an information processing apparatus, and more particularly, to setting and modifying storage configuration information. The invention also relates to a storage device capable of setting such configuration information.

2. Description of the Related Art

Information processing devices and the like in system environments continually become more complex, and various proposals have been presented to simplify the setting operations of such complex information processing devices. Setting the configuration information (for example, path definition, creation of logic volume, physical format, security information) of a storage device in an information processing system involves the risk of data loss due to an increase in the number of setting operations and in wrong settings made by supervisors, because the devices have become large and complex.

JP-A-5-128032 proposes, as a method of solving such problems, a technique for settings in a network environment, which can be set by end users of average skill. Another Japanese patent application, JP-A-6-175827i. proposes a technique of automatically creating settings of a network environment in which a program is implemented on a computer, to eliminate the need for end users to make the difficult settings for an environment. Further, JP-A-11-161604 discloses a technique in which the settings for a network environment with connected clients are preserved as a script file in a server connected to the network and automatically downloaded for setting the environment.

Even with a Graphical User Interface (GUI), setting modifications can cause unexpected equipment trouble even with supervisors performing the setting operations. To prevent such unauthorized operation, JP-A-2000-181687 discloses a method in which system management information is preserved in two memories and errors are avoided by referring to one of the memories when an error occurs after system management information in the other memory is edited. JP-A-2000-181687 also discloses a method in which a password is required when setting information is edited. These methods ensure that system management information is safely preserved.

However, when the settings for the environment and structure of an information processing device are modified, operations in the modified environment are sometimes incompatible with those performed in the previous environment and structure. For example, when the structure of storage areas in a storage device is modified, concern arises that the operations may call for data being written into areas in positions essentially unsuitable for writing.

In particular, in structural modification, such as setting the storage areas of a storage device, the integrity of written data must also be guaranteed for subsequent structural modifications. Password management as disclosed in JP-A-2000-181687, in which it suffices to divide an environment to provide environments that users cannot use, cannot resolve this problem. Moreover, in order to avoid the risk of data loss or the like, confirmation of whether the script is composed of data created for setting modification and generating a command group must be guaranteed in the operation.

In cases where returning to a previous state is desired for some reason, and in situations in which device environments enlarge, for example, storage devices, errors allow past data to be released. With such occurrences, there is also a requirement to return to that environment/structure at a time when the data being released was accumulated.

BRIEF SUMMARY OF THE INVENTION

This invention Overcomes the difficulties of the above prior art, and provides a highly reliable storage control device in which the approval or denial of the execution of commands is determined when a command group relating to configuration information of a storage is received.

A first embodiment of the invention provides a storage device to receive commands for writing data into and reading data from host devices to control writing and reading of data in storage media. The storage device comprises a service processor for setting storage device configuration information, and a terminal device connected to the service processor a private line for sending a command group received from an operator, and related to the storage device configuration information, to the service processor. The service processor comprises a means for determining approval or denial of execution of the command group.

In addition, the terminal device in the invention sends encryption command information, created by encrypting the command group with a secret key, together with the command group. The determining means decrypts the encryption command information to determine whether the command group obtained by the decryption corresponds to the received command group, and executes the command group if correspondence is ascertained.

A method of setting configuration information for a storage device configured in the above manner includes sending the command group via the terminal device, receiving at a service processor the command group sent, and approving or denying execution of the command group, and executing the command group when approval of execution is determined in the second step.

More preferably, in a device thus constituted, the invention provides a step of using a secret key to encrypt the command group prior to sending it to the service processor to generate encryption command information. The encryption command information together with the command group is sent to the service processor. Then the processor decrypts the received encryption command information to generate the command group and compares the received command group with the command group obtained by the decryption for correspondence to each other, thus determining approval or denial of execution of the received command group. When the command group obtained by the decryption and the received command group correspond to each other, the processor executes the command group.

According to the invention, modification of much configuration information can be collectively made with the use of a script sheet. Other devices also read a script sheet whereby such settings can be applied to a plurality of storage devices. Since the storage device does not modify its structure for script sheets other than a previously authenticated one, the structure of the storage device can be modified by information, set by a reliable operator and an operation program, whereby providing a safe setting modification environment free from mistakes is made possible.

In addition, since communication is possible with an input interface separate from an interface connected to the host computer, settings can be made without connection to the host computer. Even when the operating system (OS) of the host computer is not started, a script sheet makes it possible to collectively set storage device configuration information and to make a setting for connecting the storage device and the host computer itself.

Furthermore, unlike a device in which the operational environment is switched over by a multiplicity of operators, the history of the operational environment and the device configuration information is accumulated in a device for continuous information processing, so that a means can be provided that is effective when a state is restored after an error is generated and when the reason for error generation is traced. An advantageous results in that an operator can execute many operations at a time. Other features and objects of the invention than those described above will become apparent when reading the descriptions herein with reference to the accompanying drawings.

DETAILED DESCRIPTION OF THE INVENTION

Figure 1:
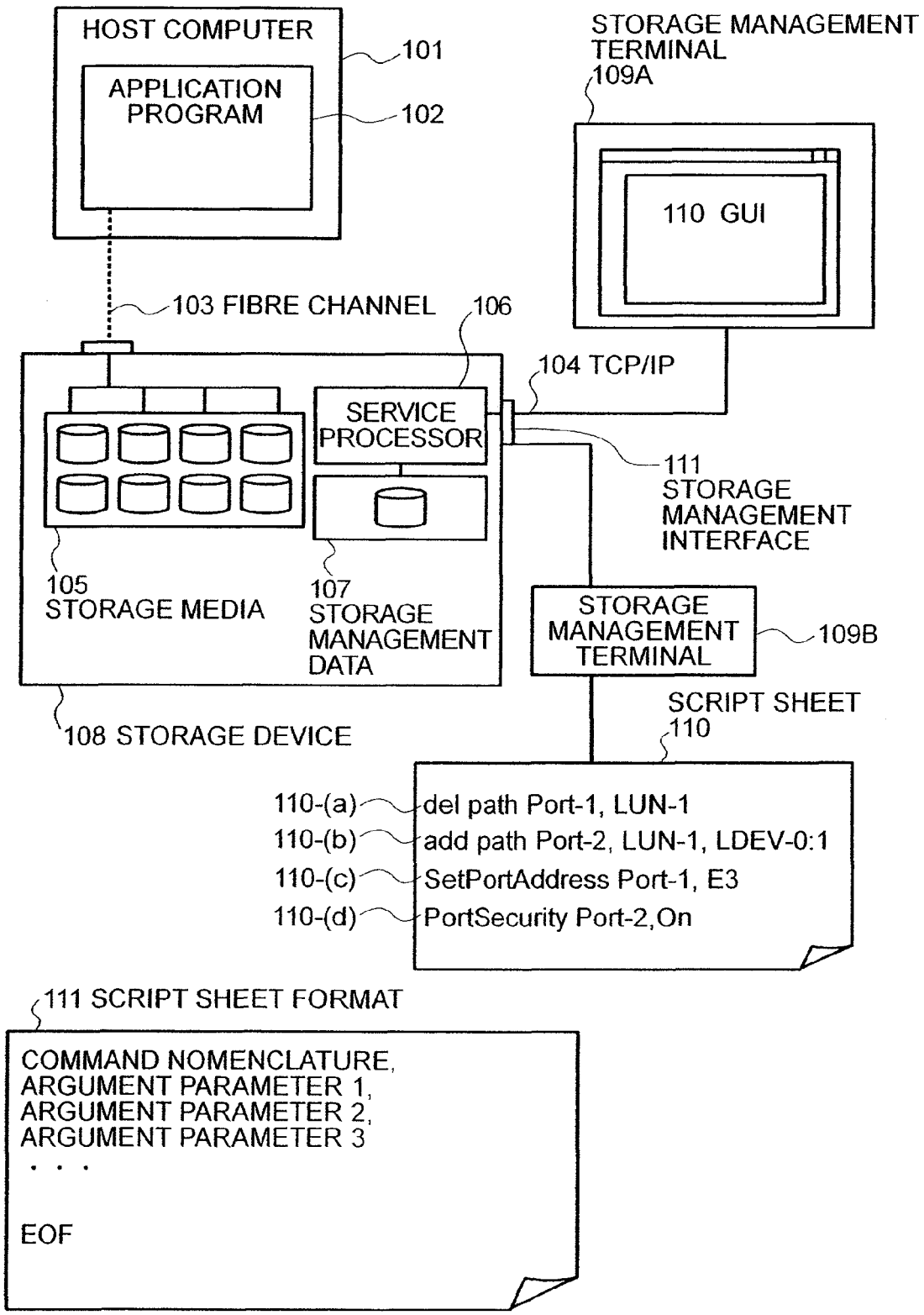
FIG. 1 is a block diagram showing a configuration of an embodiment of the invention.

FIG. 1 is a block diagram showing connections in a storage system 100 for information processing devices. A storage device 108 is connected to a host computer 101 via a fibre channel 103 to input and output data to storage media 105 on the basis of a command from host computer 101. An application program 102 is software for operating the host computer.

A storage management terminal 109A is connected via a local area network (LAN) to create configuration information for storage device 108 to send to the storage device. "Storage configuration information," as used herein, means various settings in a storage device and includes, for example, setting of logic volumes virtually divided on storage media 105.

In this example, storage management terminal 109A is connected to storage device 108 using a TCP/IP protocol. Control information from storage management terminal 109A is sent and received between a service processor 106 loaded in storage device 108 and a GUI application 110 operating in storage management terminal 109A. In this embodiment, a further storage management terminal 109B is connected to service processor 106 via a storage management interface 111.

An operator sends control information, such as configuration information or the like, to service processor 106 in storage device 108 via storage management terminal 109B, and service processor 106 updates storage management data 107 on the basis of the control information and resets the structure of the storage device. Meanwhile, the service processor monitors the operating condition of the storage device in order to send the information to storage management terminals A and B via storage management interface 111 and a TCP/IP 104. An operator can recognize from the information received at storage management terminals A and B whether the optimum structure of the storage device has been set.

Conventionally, the configuration information of storage device 108 has been set on a GUI screen 110 displayed on storage management terminals. According to the invention, however, a script sheet is used in place of, or in addition to a GUI screen. A script sheet, as referred to herein, means a command group with which a service processor sets the structure of a storage device, and which may contain variables required for execution of commands. Such a command group is also called a script definition file, and a processor sequentially reads commands defined in a script to interpret and execute the commands.

Specifically, script language is used to describe the commands and parameters required for modifying the setting of the storage device structure, which is created by a GUI application program for structure modification operating on storage management terminal A or B. The service processor reads the script sheet to interpret and execute the commands described therein. As shown in FIG. 1, script sheet 110 is a group of operations relating to the addition and deletion of such path definition information as 110-(a) and 110-(b) for connection of host computer 101 and the logical volumes of storage device 108. Also described in the script sheet are operations 110(a) to 110(d) for setting and changing addresses of Fibre Channel Ports or for toggling the Fibre Channel Ports' security switches On/Off.

Script sheet format ILL, shown in FIG. 1, is an example in which a setting procedure is written that describes respective settings as argument parameters for setting nomenclatures and information required for the setting thereof. Script sheet 110 in this example has the following meanings. In 110-(a), a path defined in Logical Unit Number (LUN) 1 of Fibre Channel Port 1 is deleted. In 110-(b), the path defined in LUN 1 of Fibre Channel Port 2 is added, and the ID of the logic volume to which the host computer has access is designated 1-1. In 110-(c), the Fibre Address of Fibre Channel Port 1 is designated E3, and in 110-(d), a security switch of Fibre Channel Port 2 is turned Off to impose restrictions on access from the host computer. Such descriptions enable modification of the structure in large quantities to be read and executed by the CPU of a computer for processing, instead of being set through a GUI operation by an operator using key input and a mouse.

Script sheet format can be dealt with through division into multiple sections and comprehensible descriptions. More specifically, a system referring to sub-script sheets for every setting nomenclature and defining the argument parameters required for operations may serve. Although this system involves numerous sheets, description is facilitated because the parameters are regularly described with every setting.

Block 601 is an example of a script sheet structure affording convenience when commands described in a script sheet include numerous argument parameters. This example is effective when the same setting is frequently used for argument parameters. Script sheet 603 defines the command "delpath" as deletion of paths communicated to the respective logic units of a port group described in a subsequent text file "eletePathe.txt". In this example, the embodiment is configured such that information in a script sheet is not sent to storage device 108 via fibre channel 103 but is physically interpreted by the service processor through storage management interface 111, which constitutes a logically different interface. That is, because the system of setting via fibre channel 103 cannot use a script sheet unless fibre channel 103 connects to the storage device and host computer 101, setting configuration information is impossible when host computer 101 is not started up and when an operating system of host computer 101 overruns.

In addition, troublesome settings, such as setting addresses of ports for connection in large quantities, which should be made by connection to host computer 101, are impossible with a method of interpreting and executing a script sheet on the assumption that operations using host computer 101 are performed. Through storage management interface 111, script sheet 110 enables setting irrespective of connection or nonconnection to the host computer connected to storage device 108.

Whereas the script sheet 110 enables setting in large quantities, the script sheet itself constitutes text data, which can be easily tampered with, and it is difficult to determine whether tampering has occurred. Moreover, when an error is present in a script fie, once set, it is difficult to return the file to an original setting. In a preferred embodiment, the following device is provided to solve the problem. A structure modifying module composed of storage management terminal 109A and service processor 106 is configured to include a module for rejecting script sheet 110 unless electronic authentication has been made; and a module for managing history information when configuration information is modified in the script sheet.

Figure 2:
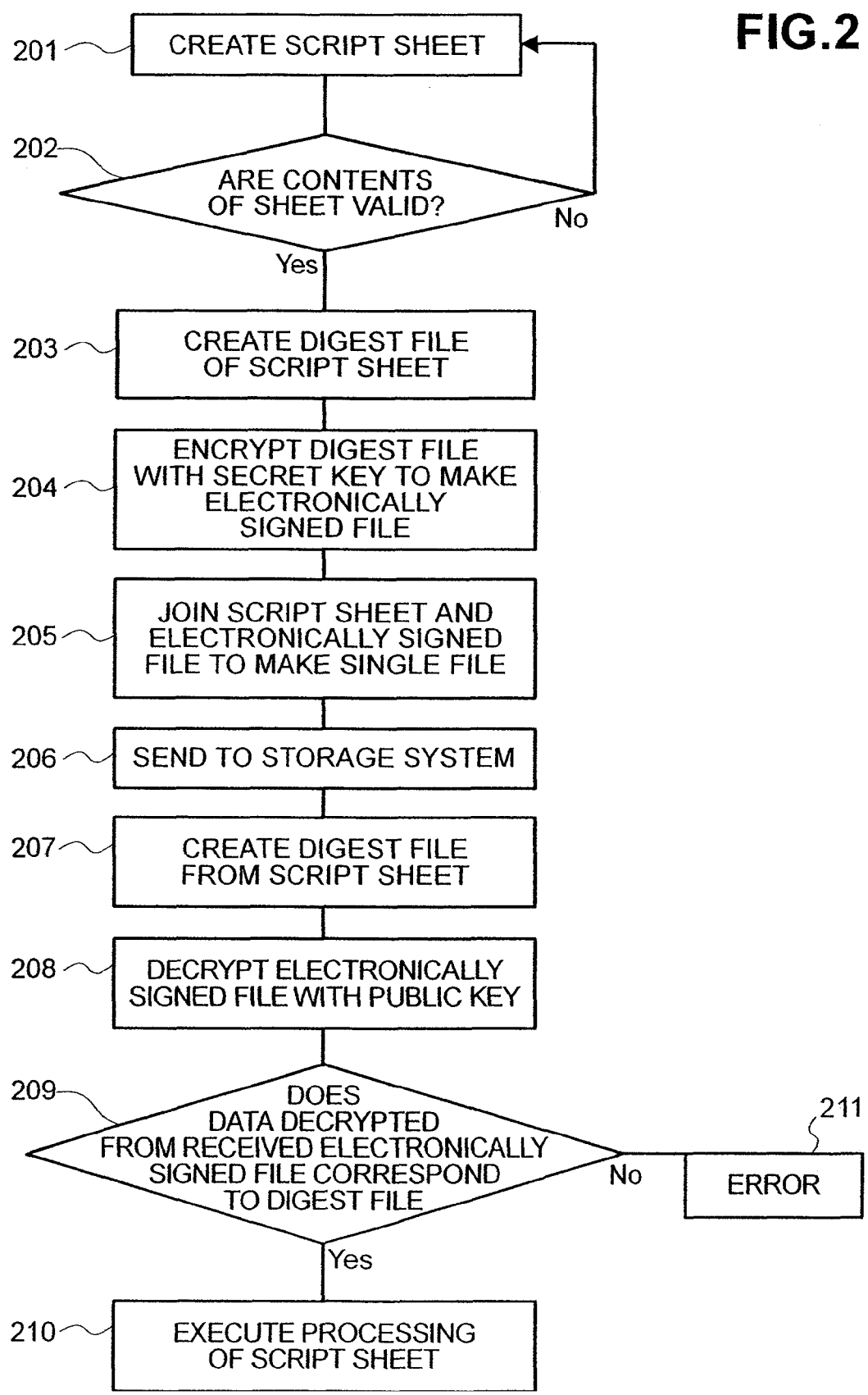
FIG. 2 is a flowchart illustrating an exemplary processing flow according to the invention.

The module for rejecting an unauthenticated script sheet comprises the steps of creating a script sheet, which is guaranteed by a reliable operator as having a normal structure, and guaranteeing that no tampering has occurred before input into the storage device. FIG. 2 shows a specific processing flow. An operator creates a script sheet (201), confirms that the contents of the sheet are valid (202), and starts an electronic authentication processing to guarantee accuracy when the contents are valid.

In this example, validity of data may be configured such that a script sheet is temporarily set to the service processor and a microprogram loaded on the service processor checks the contents of the script sheet comparing them with a physical structure of the storage device, or validity verification can be configured such that the consistency of data is .checked by reliable software, which is software created by a person having a secret key in the subsequent encryption processing.

Checking of consistency also means checking for the presence or absence of a structural inconvenience that, for example, a newly set logic volume is one, the setting of which is impossible on an actual, loaded storage medium. It is also possible to check whether information set in the script sheet meets a customer's requirements (an electronic file according to specifications required by a customer, or the like). In this case, it suffices to determine whether a fie, which a customer creates by writing data into an essential column, is consistent with the contents of a script sheet created by an operator.

When the validity of a script sheet is confirmed, authentication processing is executed to show that the script sheet is correct. Creation of a script sheet, confirmation of validity, and authentication processing are carried out using storage management terminals A and B, but may be but may be executed using other information processing devices. Subsequently, a procedure is shown for confirming that a script sheet, which has been created by valid processing, as described above, and the script sheet validated, is reliable.

In the example, a digest file, in which a script sheet is condensed, is created (203). A digest file depends upon information in a script sheet and is created for that script sheet, for which validity checking was completed in STEP 202, to show that the validity of the script sheet has been guaranteed in STEP 202. The digest file may be created by compressing a script sheet. A digest file is created from a script sheet. Accordingly, the digest file serves at least as a standard for termination of validity checking (203).

Next, an operator who intends to set the structure of storage device 108 using a digest file, creates the fie by encrypting the digest fie with a secret key (204). Because a file obtained in STEP 204 cannot be created by anyone other than an operator having a secret key, it can be considered an electronically signed file.

An operator joins the electronically signed fie and a script sheet together to make a fie (205) to send to service processor 106 of storage device 108 (206). In this example, an electronically signed fie, that is, the fie obtained by encrypting a digest fie in which a script sheet describing a command group is compressed, and the script sheet are sent as a single file, but the script sheet and the electronically signed fie may be separately sent to service processor 106.

Service processor 106 having received the electronically signed file creates a digest fie from the script sheet (207), and then creates another file by decrypting the electronically signed fie (encryption) with a public key. Service processor 106 compares the digest file created by the service processor and the file obtained by decrypting the encrypted electronically signed file with a public key (209).

That is, service processor 106 compares the digest file created from the script sheet and a digest file created by an operator who has a secret key. When the contents of both files correspond to each other, it can be guaranteed that a sheet, which meets a customer's requirements and does not cause any inconvenience in setting a new or modified structure, has been sent from a reliable operator.

Once the script sheet is guaranteed in STEP 209, service processor 106 interprets the script sheet to execute the setting of storage device 108 in accordance with the configuration information of the script sheet (210). Encryption of a script sheet, or a file obtained by creating a digest of a script sheet, is explained below.

A secret key system uses a technique in which an operator or a control device having a secret key (cord) uses the cord to encrypt information, and the encrypted information cannot be decrypted by operators or control devices other than those having the same secret key. By performing encryption in this system subsequent to the completion of validity checking, execution of commands in the service processor is permissible only with respect to that script sheet, which has been created by an operator having a secret key, thereby eliminating use either of script sheets that have been tampered with, or of inappropriate script sheets in modifying configuration information.

In addition, although the procedure of creating a digest file for encryption has been described in the example, there is a method of directly encrypting a script sheet with a secret key in which a digest fie is not created. In this case, encrypted information and a script sheet are sent to service processor 106, which decrypts the encrypted information with a secret key to create a script sheet, and compares the created script sheet and the received script sheet. In this way, the script sheet can be recognized as valid and having been sent through a reliable procedure.

When a digest file is created, in addition to reducing the transmission and reception time between storage management terminal 109B and service processor 106, which the command group is being transmitted becomes easy to recognize by creating the digest file in a manner to indicate a feature of the equipment structure.

By providing two stages, that is, the step of compressing a script sheet as a digest and the step of encryption with a secret key as in the example, indicates that a compressed script sheet is one having undergone validity checking, so that, for example, an operator can perform management steps in which the most appropriate digest fie is extracted from a multiplicity of digest files and encrypted with a secret key owned by the operator, to be sent to service processor 106.

In addition, by specifying an operator or operators having a secret key, only a reliable operator/operators or enterprise/enterprises can provide a script sheet in operation. Moreover, a reliable operation may be configured to apply automatic encryption with a secret key after validity checking is performed not only by an operator but also by a reliable enterprise, or by reliable software.

Figure 3:
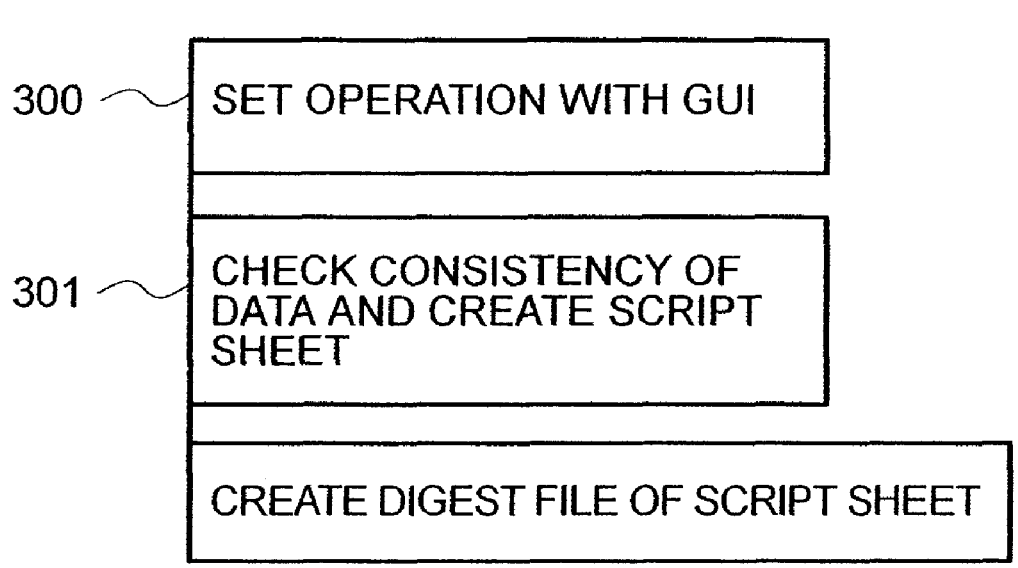
FIG. 3 is a flowchart illustrating a procedure for creating a configuration information modification script sheet with a GUI and making its digest, according to the invention.

FIG. 3 shows an example in which an electronic signature is applied after a software program checks configuration information data modified by the GUI operation performed by an operator and guarantees that the data is consistent. More specifically, an operator cares out an operation using a GUI screen for setting configuration information of storage management terminal 109A. The GUI program has a previously loaded consistency monitoring function to prevent an inappropriate setting in a storage device, and is configured to impose restrictions such that logic volumes of different sizes are not selected as a pair. In this manner, the contents of a script sheet can be guaranteed by applying a secret key only to a script sheet created in a setting operation with specified software and encrypting the script sheet with a secret key.

Figure 4:
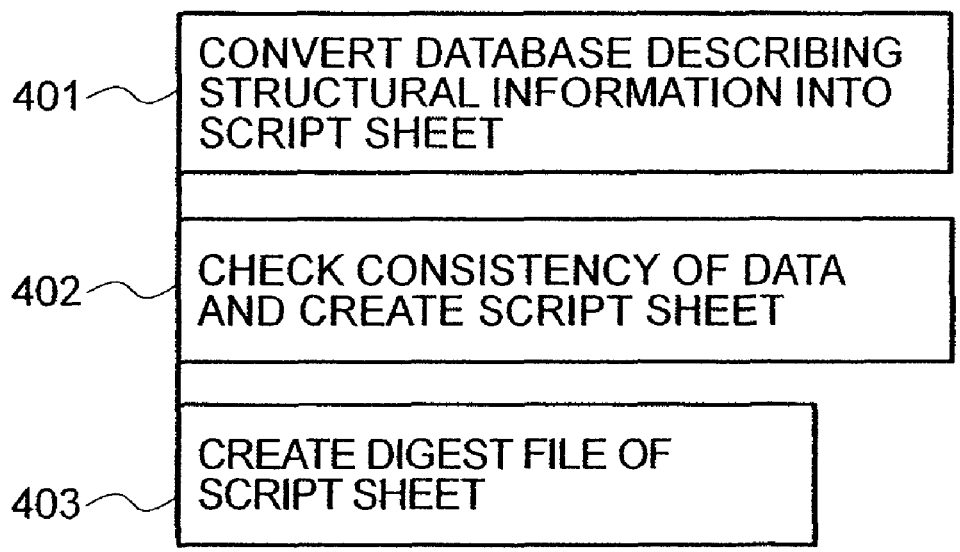
FIG. 4 is a flowchart illustrating a procedure of creating a script sheet and its digest, according to the invention.

FIG. 4 shows an example in which information is read from a database in which configuration information is recorded via storage management terminal 109, and a software program checks the consistency of data in the read information to convert the information into a script sheet on which to apply an electronic signature. In this example, when the database itself is reliable, a method of checking configuration information reliability by checking whether information has been taken out of the database may be used.

Figure 5:
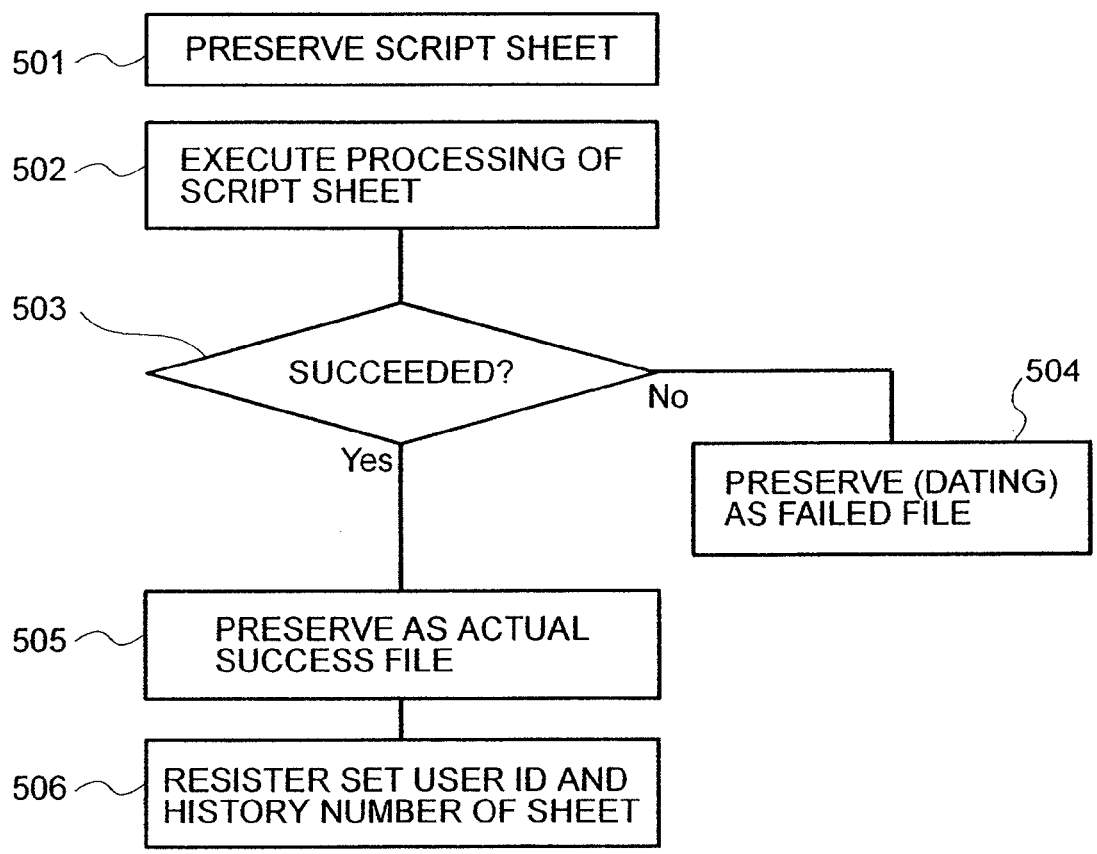
FIG. 5 is a flowchart illustrating a procedure for using and preserving a script sheet according to the invention.
Figure 6:
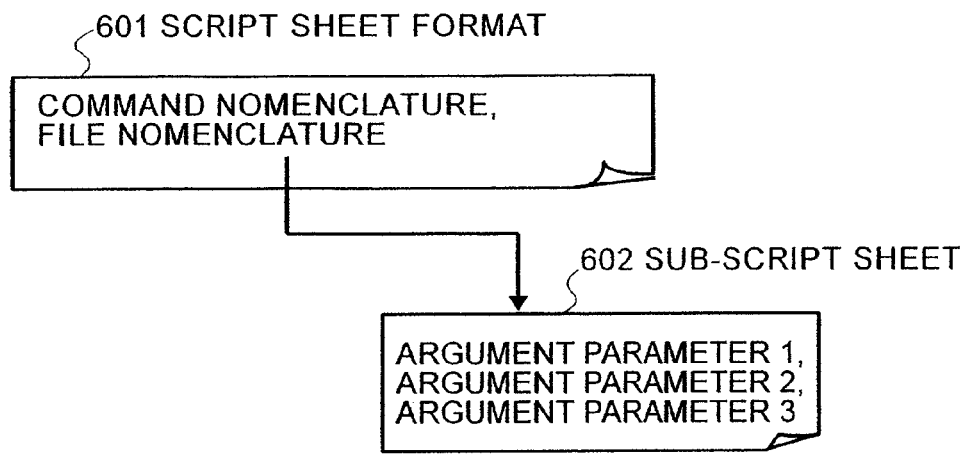
FIG. 6 is an illustration showing an example of a format sheet according to the invention.
Figure 6:
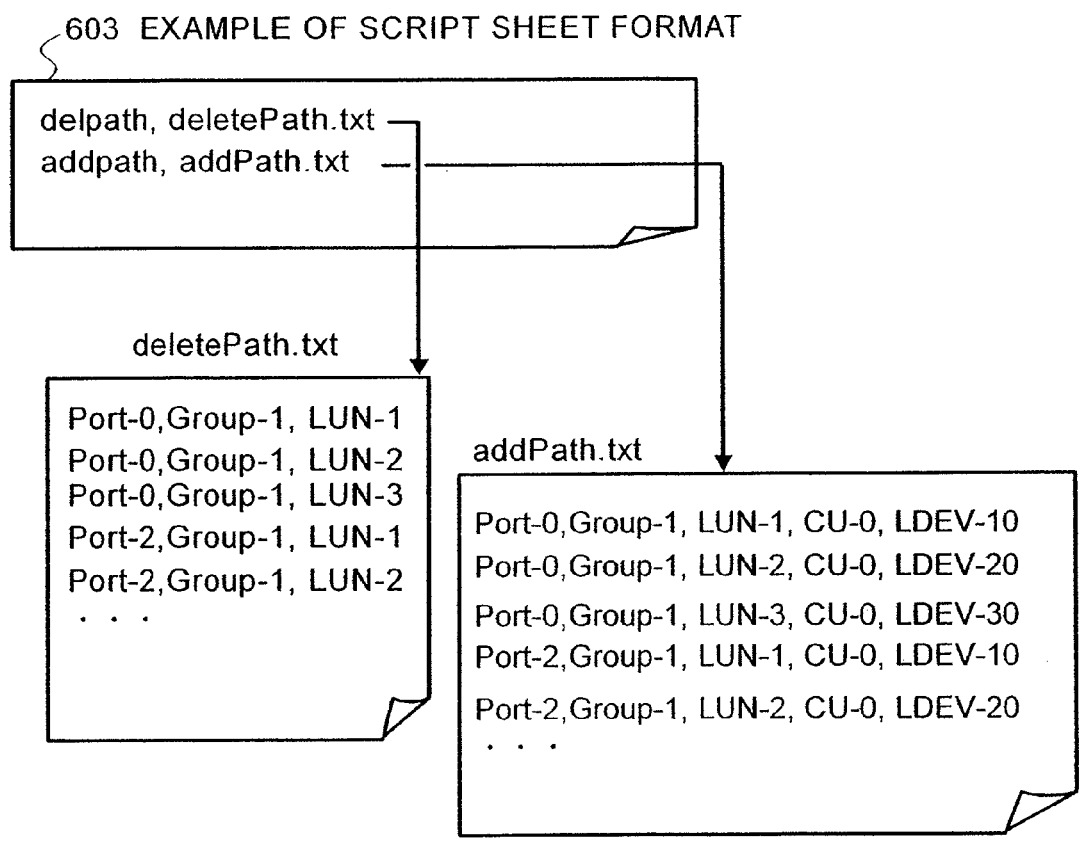

A mechanism for managing history information when configuration information is modified in a script sheet is now described in detail with reference to the processing flow shown in FIG. 5. With this method, it is possible to return to a desired state when returning to a past state becomes necessary after modification in large quantities has been made by a script sheet.

First, data described in a script sheet is read by service processor 106 (501). Then, service processor 106 interprets the commands that were read in STEP 501, and executes the processing therefor (502). When processing is successful, the script sheet is preserved in storage management data 107, as a script having proven success, and, at the same time, a history management number and user ID are registered in the sheet so that when a setting was created or modified and the source of that setting can be known.

Figure 7:
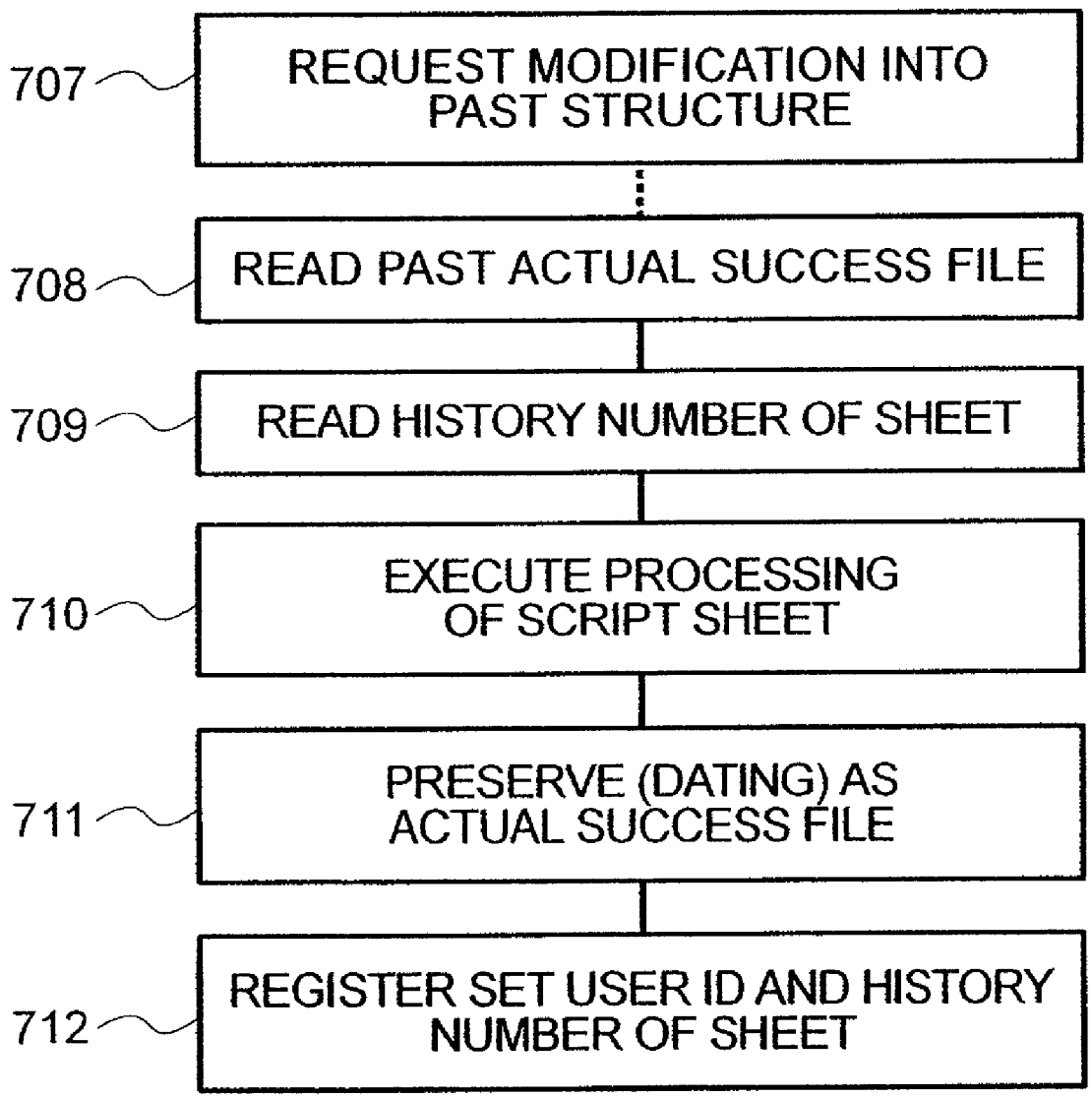
FIG. 7 is a flowchart illustrating a procedure for returning to a previous configuration information setting, according to the invention.

Data used in this registration can also be input by an operator when the script sheet is read. Moreover, when the script sheet is created, operating software therefor can be used to preserve the data in the script sheet. When a request (707) for modification of a past structure is made, as shown in FIG. 7, an operator inputs the history management number corresponding to the configuration information so that the service processor can execute the structure modifying processing described in the related script sheet, thus enabling returning to the original configuration information.

More specifically, an operator inputs a history management number via storage management terminal 109. Service processor 106 refers to storage management data 107 in storage device 108 to read a script sheet corresponding to the history management number to execute processing therefor. Then, data for the date and hour the script sheet was executed, is added to the script sheet to be accumulated as storage management data. In addition, the script sheet referred to here is a group of information and commands for modification of configuration information and various configurations can be designed.

In other words, according to the invention, when a command group with which configuration information is modified and the parameters required to execute the commands by the service processor from an outside source, the service processor can check the validity of the commands to determine whether to execute them.

The command group is also encrypted to create encryption command information; both the encryption command information and the command group are sent to a processor for execution of the processing; the processor having received such information decrypts the command information and compares it with the received command group; and on the basis of those results the processor determines whether the received command group can safely modify the configuration information of the device.

By providing a correlation between commands used in script description and commands, which the service processor actually interprets and executes, an instruction in that expression, which an operator can easily understand, can be given to the service processor. Furthermore, taking account of an unauthorized operation presumed with achieving convenience through such simplification, the service processor is configured to incorporate processing for determining whether the script sheet is safe for the device. When the script sheet has been authenticated, the service processor receives the commands to process the modification of a structure.

Although the preferred embodiments of the invention have been described in detail, it should be understood that various changes, replacements, and modifications may be made without departing from the spirit and scope of the invention described in the appended claims.

What is claimed is:

1. A storage device, which receives demands for writing and reading data from host devices to control writing and reading data from logical volumes in said storage device, comprising:

a storage media configured to provide said logical volumes, a service processor configured to set configuration information of the storage device, and connected to a terminal device, wherein said terminal device receives a command group described on a script sheet, checks a validity of said command group, if said command group is valid, encrypts said command group, and sends said command group and said encrypted command group to said service processor, wherein said service processor receives said command group and said encrypted command group from said terminal device, decrypts said encrypted command group, compares said received command group with said decrypted command group, and determines approval or denial of execution of said command group based on results of the comparison prior to execution of the command group received from the terminal device wherein said command group is related to the configuration information of the storage device; and wherein said storage device maintains, with a history management module, information about command groups for which execution is denied.

2. A storage device according to claim 1, wherein said service processor is connected to said terminal processor via private line.

3. The storage device according to claim 1,
wherein said service processor decrypts, by using a secret key, said encrypted command group that is encrypted by using said secret key at the terminal device.

4. The storage device according to claim 1, wherein the command group is used by said service processor to set a structure of the storage device.

5. The storage device according to claim 1,
wherein the command group contains variables required for execution of commands by the service processor.

6. The storage device according to claim 1,
wherein said command group includes a group of operations relating to addition and deletion of path definition information for connection of said host device and said logical volumes of the storage device.

7. The storage device according to claim 1,
wherein said command group includes a setting procedure that describes respective setting as argument parameters for setting nomenclatures and information required for settings thereof.

8. The storage device according to claim 1,
wherein said command group is determined to be valid by a reliable operator guaranteeing that no tampering has occurred before input into the storage device.

9. A method of setting configuration information of a storage device, said storage device receives demands for writing and reading data from host devices to control writing and reading data from logical volumes provided with a storage media in said storage device and includes a service processor configured to set configuration information of the storage device and connected to a terminal device, said method comprising:

receiving a command group described on a script sheet by said terminal device, checking a validity of said command group, encrypting said command group if said command group is valid based on said checking, sending said command group and said encrypted command group from said terminal device to said service processor, receiving said command group and said encrypted command group by said service processor, decrypting said encrypted command group, comparing said received command group with said decrypted command group, determining approval or denial of execution of said command group based on results of the comparison prior to execution of the command group received from the terminal device, wherein said command group is related to the configuration information of the storage device; and wherein said storage device maintains, with a history management module, information about command groups for which execution is denied.

* * * * *